United States Patent
Li et al.

(10) Patent No.: US 12,476,295 B2
(45) Date of Patent: Nov. 18, 2025

(54) HEATABLE BATTERY PACK, HEATABLE BATTERY SYSTEM, AND VEHICLE

(71) Applicant: CONTEMPORARY AMPEREX TECHNOLOGY (HONG KONG) LIMITED, Hong Kong (CN)

(72) Inventors: Xingxing Li, Ningde (CN); Xiaoteng Huang, Ningde (CN); Zhiming Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 256 days.

(21) Appl. No.: 18/087,248

(22) Filed: Dec. 22, 2022

(65) Prior Publication Data

US 2023/0125606 A1    Apr. 27, 2023

Related U.S. Application Data

(63) Continuation of application No. PCT/CN2022/098233, filed on Jun. 10, 2022.

(30) Foreign Application Priority Data

Sep. 28, 2021  (CN) .......................... 202122367357.1

(51) Int. Cl.
*H01M 10/615* (2014.01)
*B60L 58/12* (2019.01)
(Continued)

(52) U.S. Cl.
CPC .......... *H01M 10/615* (2015.04); *B60L 58/12* (2019.02); *B60L 58/27* (2019.02); *H01M 10/425* (2013.01);
(Continued)

(58) Field of Classification Search
None
See application file for complete search history.

(56) References Cited

U.S. PATENT DOCUMENTS

| 8,605,450 B2 | 12/2013 | Kaneshige et al. |
| 10,744,885 B2 | 8/2020 | Jammoul et al. |

(Continued)

FOREIGN PATENT DOCUMENTS

| CN | 102842935 A | 12/2012 |
| CN | 104442636 A | 3/2015 |

(Continued)

OTHER PUBLICATIONS

Wang, CY., Zhang, G., Ge, S. et al. Lithium-ion battery structure that self-heats at low temperatures. Nature 529, 515-518 (2016). https://doi.org/10.1038/nature16502 (Year: 2016).*

(Continued)

*Primary Examiner* — Jonathan G Leong
*Assistant Examiner* — Claire A Rutiser
(74) *Attorney, Agent, or Firm* — ANOVA LAW GROUP, PLLC

(57) ABSTRACT

The present application provides a heatable battery pack, a heatable battery system and a vehicle having thereof. The heatable battery pack includes a battery, a first switch module, and a heater that are connected in series to form a heating loop. The first switch module turns on the heating loop after a drive signal is received. Compared with the related art in which heaters in various battery packs are connected in series to both ends of a drive module in a high-voltage box, so as to perform high-voltage power supply on the heaters by the high-voltage box through a series loop, the present application directly performs low-voltage power supply on respective heaters by batteries in the battery packs, and the high-voltage power supply by the (Continued)

drive module is not required, which significantly improves the safety of power supply.

12 Claims, 2 Drawing Sheets

(51) Int. Cl.
*B60L 58/27* (2019.01)
*H01M 10/42* (2006.01)
*H01M 10/48* (2006.01)
*H01M 10/625* (2014.01)
*H02J 7/00* (2006.01)

(52) U.S. Cl.
CPC ......... *H01M 10/48* (2013.01); *H01M 10/625* (2015.04); *H02J 7/0048* (2020.01); *B60L 2240/549* (2013.01); *H01M 2220/20* (2013.01)

(56) References Cited

U.S. PATENT DOCUMENTS

| | | | | |
|---|---|---|---|---|
| 2006/0290325 | A1 | 12/2006 | Ashtiani | |
| 2011/0288704 | A1* | 11/2011 | Schwarz | H01M 10/6571 219/202 |
| 2012/0105001 | A1* | 5/2012 | Gallegos | B60L 53/66 320/109 |
| 2012/0105010 | A1* | 5/2012 | Kinoshita | H01M 10/63 320/136 |
| 2012/0133329 | A1* | 5/2012 | Yoshida | H01M 10/6571 320/150 |
| 2013/0307483 | A1* | 11/2013 | Yoshida | H01M 10/6551 429/120 |
| 2014/0077755 | A1* | 3/2014 | Zhang | H01M 10/657 320/107 |
| 2017/0098874 | A1* | 4/2017 | Shen | B60H 1/00278 |
| 2021/0245628 | A1* | 8/2021 | Zuo | B60L 58/25 |

FOREIGN PATENT DOCUMENTS

| | | |
|---|---|---|
| CN | 111216600 A | 6/2020 |
| CN | 216054914 U | 3/2022 |
| JP | 2014038734 A | 2/2014 |
| WO | 2011016497 A1 | 1/2011 |
| WO | 2012105636 A1 | 8/2012 |

OTHER PUBLICATIONS

The Japan Patent Office (JPO) Decision to grant a patent for Application No. 2022-562817 Feb. 20, 2024 5 Pages (including translation).

The Korea Patent Office (KRO) Request for the submission of an opinion for Application No. 10-2022-7035496 Jul. 18, 2024 17 Pages (including translation).

Guangdong Changling Air Conditioning Air Conditioner Manufacturing Co., Ltd., International Search Report and Written Opinion, PCT/CN2022/098233, Aug. 25, 2022, 9 pgs.

State Intellectual Property Office of China Notice of Grant of Invention Patent Right for Application No. 202122367357.1 Feb. 7, 2022 2 pages (including translation).

The European Patent Office (EPO) The Extended European Search Report for Application No. 22789146.2 Dec. 12, 2023 7 Pages.

The Japan Patent Office (JPO) Notification of Reasons for Refusal for Application No. 2022-562817 Dec. 19, 2023 9 Pages (including translation).

* cited by examiner

HEATABLE BATTERY PACK, HEATABLE BATTERY SYSTEM, AND VEHICLE

CROSS-REFERENCE TO RELATED APPLICATIONS

This application is a continuation application of PCT Patent Application No. PCT/CN2022/098233, entitled "HEATABLE BATTERY PACK, HEATABLE BATTERY SYSTEM, AND VEHICLE" filed on Jun. 10, 2022, which claims priority to Chinese Patent Application No. 202122367357.1, entitled "HEATABLE BATTERY PACK, HEATABLE BATTERY SYSTEM, AND VEHICLE" filed with the State Intellectual Property Office of the People's Republic of China on Sep. 28, 2021, all of which are incorporated herein by reference in their entirety.

TECHNICAL FIELD

The present application belongs to the field of battery technologies, and relates to a heatable battery pack, a heatable battery system, and a vehicle.

BACKGROUND ART

An electric vehicle refers to a vehicle powered by a power battery. Due to material limitation, a power battery can stably exert its best performance only at a rated ambient temperature. Therefore, when using an electric vehicle in a region with a low ambient temperature or in winter, the power battery needs to be heated to the rated ambient temperature.

At present, each power battery is provided with a heater, and the heaters and a drive module in a high-voltage box are connected in series to form a series loop, so that the drive module performs high-voltage power supply on the heaters through the series loop, and then the heaters heat respective batteries. However, the safety of high-voltage power supply is low, and it is prone to high-voltage breakdown, ignition, and other undesirable phenomena, which may even affect the safety of electric vehicles in severe cases.

SUMMARY OF THE INVENTION

In view of the above problems, the present application provides a heatable battery pack, a heatable battery system, and a vehicle, wherein batteries in the battery pack performs low-voltage power supply on respective heaters, which significantly improves the power supply safety.

In a first aspect, the present application provides a heatable battery pack, including: a battery, a first switch module, and a heater; the battery, the first switch module, and the heater are connected in series to form a heating loop, wherein the first switch module turns on the heating loop after a drive signal is received.

Compared with the related art in which heaters in various battery packs are connected in series to both ends of a drive module in a high-voltage box, so as to perform high-voltage power supply on the heaters by the high-voltage box through a series loop, the example of the application directly performs low-voltage power supply on respective heaters by batteries in the battery packs, and the high-voltage power supply by the drive module is not required, which significantly improves the safety of power supply. In addition, in this example, it is no longer necessary to set a high-voltage wiring harness to connect the heaters, and only a low-voltage wiring harness is used for connecting the battery, a first switch module, and the heater. The cost of the low-voltage wiring harness is much lower than that of the high-voltage wiring harness, and this example effectively reduces the cost of the entire heating circuit.

In some examples, the heatable battery pack further includes a manual switch, and the manual switch is connected in series in the heating loop.

In the above example, the manual switch is further connected in series in the heating loop. If the first switch module cannot be turned off due to adhesion, a technician may turn off the heating loop through the manual switch to prevent the battery from being overheated and improve the safety of the heatable battery pack.

In some examples, the heatable battery pack further includes a current sensor, and the current sensor is connected in series in the heating loop.

In the above example, the current sensor is further connected in series in the heating loop, and the magnitude of the current on the current heating loop may be detected according to the current sensor. If the current on the heating loop is too large, the first switch module may be controlled to turn off the heating loop to avoid damage to the battery pack. Moreover, according to the magnitude of the current on the current heating loop, a battery management system may calculate to obtain a current capacity of the battery.

In some examples, the first switch module is a low-voltage relay.

In the above example, the heater in the example of the present application does not require high-voltage power supply by the drive module in the high-voltage box, but accepts low-voltage power supply by the battery, and therefore, the first switch module may use a low-voltage relay, which can reduce the cost of the heatable battery pack to a certain extent compared with the use of a switch module such as the high-voltage relay.

In a second aspect, the present application provides a heatable battery system, including a battery management system, a drive module, a second switch module, and N heatable battery packs according to any of the above examples, wherein N is an integer greater than 1, the drive module is configured to output a drive signal; the battery management system is respectively connected to a detection end of each battery pack and a control end of the second switch module, and a control end of the first switch module in each battery pack is connected to the drive module through the second switch module.

In the related art, the power supply voltage provided by the drive module in the high-voltage box and the number of heaters connected in series match with each other, and the number of the battery packs and the power supply voltage provided by the high-voltage box need to be adjusted synchronously. Without changing the power supply voltage provided by the high-voltage box, if heaters are missed by mistake by the technician during the series connection, it will lead to an increase in the voltage carried by each heater, which may lead to the insulation failure of the battery pack and the connecting wire, or even cause accidents such as battery pack explosion. Compared with the aforementioned, in this example, the heating loops of various battery packs are independent of each other, and the power supply voltage of the heater is only related to the voltage of the corresponding battery and is not limited by the power supply voltage of by the high-voltage box and the number of the heaters. When the number of battery packs needs to be increased or decreased, it is only necessary to turn on or turn off the battery pack and the second switch module, which is beneficial to platformization.

In some examples, the battery management system, the drive module, and the second switch module are all integrated on a circuit board of the high-voltage box.

In some examples, the second switch module is a low-voltage relay.

In the above example, the heater in the example of the present application does not require high-voltage power supply by the drive module in the high-voltage box, but accepts low-voltage power supply by the battery, and therefore, the second switch module may use a low-voltage relay, which can reduce the cost of the heatable battery system to a certain extent compared with the use of a switch module such as the high-voltage relay.

In a third aspect, the present application provides a vehicle, including the heatable battery system according to any one of the above examples.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

BRIEF DESCRIPTION OF DRAWINGS

In order to illustrate the technical solutions in the examples of the present application more clearly, the drawings to be used in the examples or the existing technologies will be briefly introduced below. Obviously, the drawings described below are only some examples of the present application. For those of ordinary skill in the art, other drawings can also be obtained according to the drawings without any creative effort.

Figure 1:
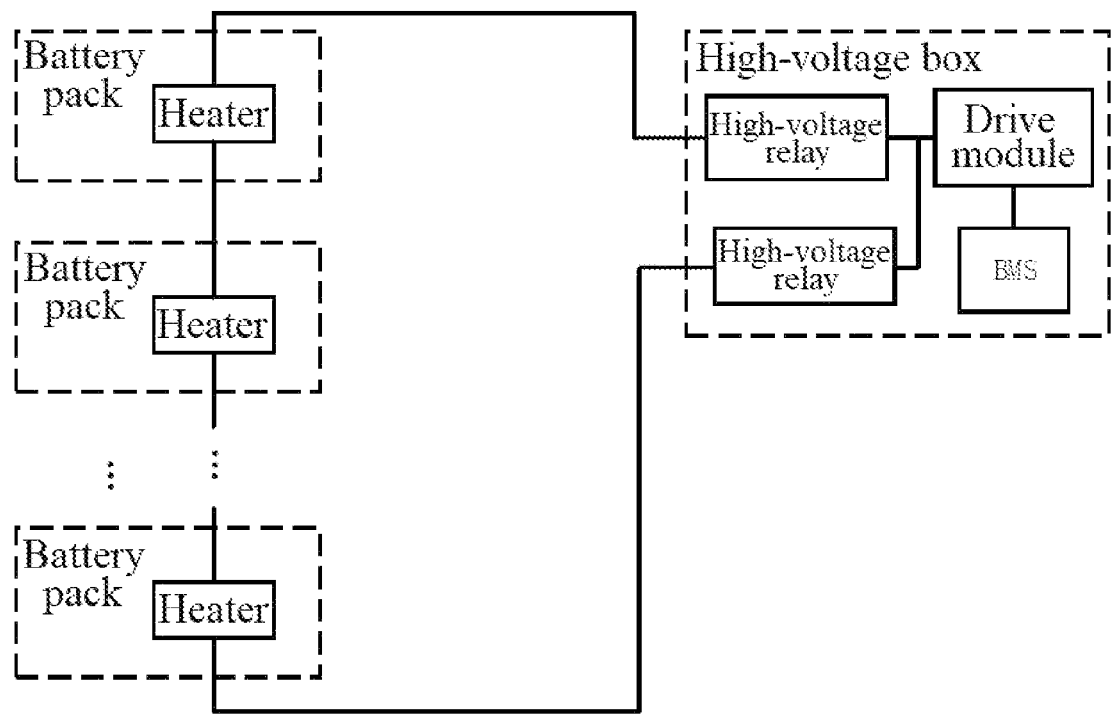
FIG. 1 is a schematic block diagram of a heating circuit in the related art.

In the drawings, the drawings are not drawn to actual scale.

Reference numerals: 1—Heatable battery pack, 2—Battery management system (BMS), 3—Drive module, 4—Second switch module; 11—Battery, 12—First switch module, 13—Heater, 14—Manual switch, 15—Current sensor.

DETAILED DESCRIPTION

For the objects, technical solutions and advantages of the examples of the present application to be clearer, the technical solutions in the examples of the present application will be clearly and completely described below in conjunction with the drawings in the examples of the present application, and it is apparent that the described examples are a part of the examples of the present application rather than all the examples. Based on the examples in the present application, all other examples obtained by those of ordinary skill in the art without creative effort fall within the protection scope of the present application.

In the description of the present application, it is to be understood that the terms "include" and "have" and any variations thereof used herein are intended to cover non-exclusive inclusion. For example, a process, method, system, product, or device comprising a series of steps or units is not necessarily limited to those steps or units expressly listed, but may include other steps or units not expressly listed or inherent to the process, method, product, or device.

Moreover, in the present application, unless otherwise expressly specified and limited, the technical terms "connect," "connected," "fix," "mount," and the like should be understood in a broad sense, such as a mechanical connection, or an electrical connection; a direct connection, an indirect connection through an intermediate medium, an internal connection of two elements, or interaction between two elements. Unless otherwise clearly defined, for those of ordinary skill in the art, the specific meanings of the above terms in the present application can be understood according to specific situations.

It is to be understood that, the orientation or positional relationships indicated by the technical terms "length," "width," "upper," "lower," "front," "rear," "left," "right," "vertical," "horizontal," "top," "bottom," "inner," "outer," and the like are based on the orientation or positional relationships shown in the drawings and are only for facilitating the description of the present application and simplifying the description, rather than indicating or implying that the apparatus or element referred to must have a particular orientation or be constructed and operated in a particular orientation, and therefore will not be interpreted as limiting the present application.

In addition, the terms "first" and "second" are used for descriptive purposes only, and cannot be construed as indicating or implying relative importance or implicitly indicating the number of technical features indicated. Therefore, a feature defined by "first" or "second" may expressly or implicitly include one or more of the features.

An electric vehicle refers to a vehicle powered by a power battery. Due to material limitation, a power battery can stably exert its best performance only in a rated ambient temperature range. Therefore, when using an electric vehicle in a region with a low ambient temperature or in winter, the power battery needs to be heated to the rated ambient temperature range. For example, when the ambient temperature of the power battery reaches 20° C. to 60° C., it is most beneficial to charge the battery. It should be noted that both the charging process and the discharging process of the battery have a rated ambient temperature range. The rated ambient temperature range corresponding to the charging process and the rated ambient temperature range corresponding to the discharging process may be the same or different, specifically depending on the properties of the power battery itself.

At present, please refer to FIG. 1, a heater is arranged in a battery pack of each power battery, and the heaters and a drive module in the high-voltage box are connected in series to form a series loop, so that the drive module can perform high-voltage power supply to the various heaters through the series loop, and then the batteries are heated by the heaters. The drive module is connected to a Battery Management System (BMS), so that the BMS controls whether the drive module outputs a voltage. In addition, the drive module may further be connected in a charging loop formed by connecting batteries in the battery packs in series (the connection relationship is not shown in the figure), so that the batteries are charged by the drive module.

Specifically, at least one high-voltage relay is connected in series in the series loop formed by connecting various heaters and the drive module in series. In FIG. 1, two high-voltage relays connected in series are used as an example, and a control end of each high-voltage relay is connected to the BMS (the connection relationship is not shown in the drawing). The BMS is further connected to a detection end of each battery pack (the connection relationship is not shown in the drawing), and configured to detect a current temperature of each battery pack. When detecting that the current temperature of each battery pack meets a preset heating condition, specifically when the current temperature is within a preset heating temperature range of the battery pack, the BMS may control each high-voltage relay to be turned on, so as to turn on the above series loop. At this time, the heaters start heating until the current temperatures of the battery packs no longer meet the preset heating condition, and the BMS may control the high-voltage relays to be turned off, so as to turn off the above series loop, and the heaters will no longer perform heating.

The number of heaters in the series loop is usually large, and each heater also has a rated working voltage; therefore, in order to meet the rated working voltage of each heater, the drive module usually needs to perform high-voltage power supply on the series loop. For example, if the number of heaters in the series loop is 30, and the rated working voltage of each heater is 20V, the voltage required to be supplied by the drive module is at least 30*20V=600V. However, the safety of high-voltage power supply is low, and it is prone to high-voltage breakdown of insulation, ignition, and other undesirable phenomena, which may even affect the safety of electric vehicles in severe cases.

Based on the above problems, the present application proposes the following technical idea: a battery in each battery pack performs low-voltage power supply on a respective heater, without the need for high-voltage power supply by a drive module, which significantly improves the safety of power supply.

Figure 2:
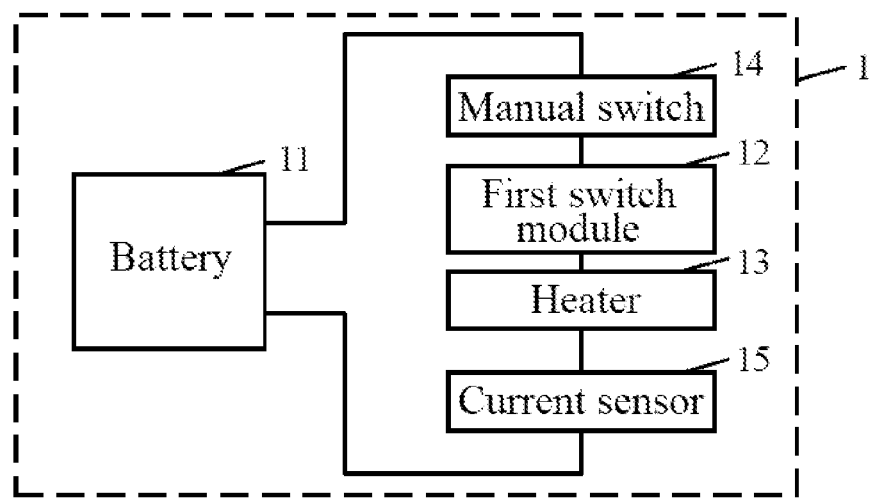
FIG. 2 is a schematic structural diagram of a heatable battery pack according to some examples of the present application.

An example of the present application provides heatable battery pack 1. Referring to FIG. 2, heatable battery pack 1 includes battery 11, first switch module 12, and heater 13. Battery 11, first switch module 12, and heater 13 are connected in series to form a heating loop, wherein first switch module 12 turns on the heating loop after a drive signal is received.

In some embodiments, battery 11 in battery pack 1 performs low-voltage power supply for heater 13, and therefore, the heating loop formed by series connection may be formed by connection with a low-voltage wiring harness. Compared with using a high-voltage wiring harness, using the low-voltage wiring harness no longer requires reserving a high-voltage wiring harness connection interface for leading out a high-voltage wiring harness out on the battery pack, which saves the cost of reserving the high-voltage wiring harness connection interface and another component (such as a connector, a seal ring, and a box reserved features) on the battery pack. It is only necessary to integrate the low-voltage wiring harness into an original low-voltage wiring harness of the battery pack, which significantly reduces the circuit cost. The low-voltage wiring harness may carry, for example, a voltage of 12V to 24V, and the high-voltage wiring harness may, for example, carry a voltage of 600V to 700V.

In some embodiments, a control end of first switch module 12 may be connected to a drive module in a high-voltage box through a second switch module. When a BMS determines that heater 13 needs to heat battery 11, the second switch module will be turned on so as to connect the drive module and the control end of first switch module 12. At this time, first switch module 12 may receive a drive signal sent by the drive module, and first switch module 12 may turn on the heating loop so that heater 13 heats battery 11.

Compared with the related art in which heaters in various battery packs are connected in series to both ends of a drive module in a high-voltage box, so as to perform high-voltage power supply on the heaters by the high-voltage box through a series loop, the example of the application directly performs low-voltage power supply on respective heaters by batteries in the battery packs, and the high-voltage power supply by the drive module is not required, which significantly improves the safety of power supply. In addition, in this example, it is no longer necessary to set a high-voltage wiring harness to connect the heaters, and only a low-voltage wiring harness is used for connecting the battery, a first switch module, and the heater. The cost of the low-voltage wiring harness is much lower than that of the high-voltage wiring harness, and this example effectively reduces the cost of the entire heating circuit.

In some examples, referring to FIG. 2, heatable battery pack 1 further includes manual switch 14. Manual switch 14 is connected in series in the heating loop. In FIG. 2, manual switch 14 connected in series between battery 11 and first switch module 12 is shown as an example.

Specifically, the technician may turn on or off manual switch 14 manually to turn on or off the heating loop, and then control whether heater 13 works.

In this example, the manual switch is further connected in series in the heating loop. If the first switch module cannot be turned off due to adhesion, a technician may turn off the heating loop through the manual switch to prevent the battery from being overheated and improve the safety of the heatable battery pack.

In some examples, referring to FIG. 2, heatable battery pack 1 further includes current sensor 15, and current sensor 15 is connected in series in the heating loop. In FIG. 2, current sensor 15 connected in series between battery 11 and heater 13 is shown as example.

Specifically, current sensor 15 is configured to measure a current of the heating loop.

In some examples, current sensor 15 may be connected to the BMS (not shown in the connection relationship diagram), and the BMS may calculate a current battery capacity of battery 11 according to the magnitude of the current measured by current sensor 15, and turn on the second switch module when it is determined that heater 13 needs to heat battery 11 in a discharging state, and the current battery capacity of battery 11 is greater than a preset threshold, so as to indirectly turn on the heating loop.

In the above example, the problem of over-discharging of the battery caused by heating the heater when the current battery capacity is low may be avoided.

In some examples, the technician may determine a current state of the heating loop according to the magnitude of the current of the heating loop measured by current sensor 15. If the current on the heating loop is too large, the heating loop may be turned off through manual switch 14 to avoid the large current from damaging the battery pack. Current sensor 15 may also be connected to the BMS. When determining that the current on the heating loop is too large, the BMS may indirectly turn off first switch module 12 by turning off the second switch module, thereby turning off the heating loop, so as to avoid the large current from damaging the battery pack.

In some examples, first switch module 12 may be a low-voltage relay.

Specifically, first switch module 12 may be a high-voltage relay, a low-voltage relay, or a switch of another structure, as long as the control end of first switch module 12 can turn on the heating loop when receiving the drive signal, wherein the drive signal may both be at a high level or a low level, or a voltage in any voltage range, which is not limited here.

In this example, the heater in the example of the present application does not require high-voltage power supply by the drive module in the high-voltage box, but accepts low-voltage power supply by the battery, and therefore, the first switch module may use a low-voltage relay, which can reduce the cost of the heatable battery pack to a certain extent compared with the use of a switch module such as the high-voltage relay.

In some examples, referring to FIG. 2, the heating circuit in heatable battery pack 1 is formed by battery 11, first switch module 12, heater 13, manual switch 14, and current sensor 15 connected in series.

Figure 3:
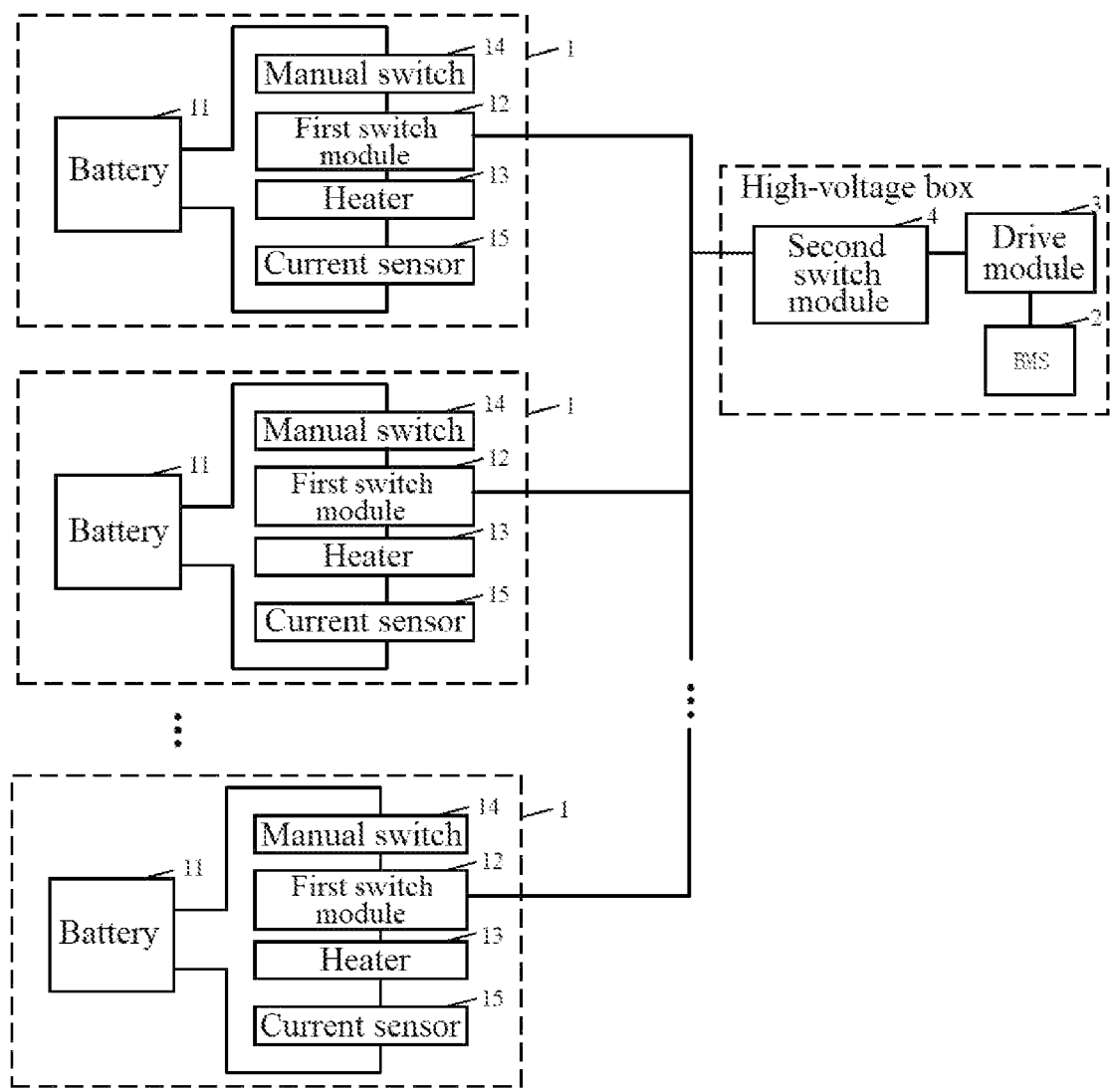
FIG. 3 is a schematic block diagram of a heatable battery system according to some examples of the present application.

An example of the present application provides a heatable battery system. Referring to FIG. 3, the heatable battery system includes battery management system 2, drive module 3, second switch module 4, and N heatable battery packs 1 according to any of the above examples, wherein N is an integer greater than 1. In FIG. 3, heatable battery pack 1 including battery 11, first switch module 12, heater 13, manual switch 14, and current sensor 15 is shown as an example.

Battery management system 2 is respectively connected to a detection end of each battery pack 1 and a control end of second switch module 4, and a control end of first switch module 12 in each battery pack is connected to drive module 3 through second switch module 4.

In the related art, the power supply voltage provided by the drive module in the high-voltage box and the number of heaters connected in series match with each other, and the number of the battery packs and the power supply voltage provided by the high-voltage box need to be adjusted synchronously. Without changing the power supply voltage provided by the high-voltage box, if several heaters are missed by mistake by the technician during the series connection, it will lead to an increase in the voltage carried by each heater. For example, if the number of heaters in the series loop is 30, and a rated working voltage of each heater is 20V, the drive module needs to provide at least a voltage of 30*20V=600V. If only 20 heaters are connected in series due to mistakes, a voltage that each heater needs to carry is 600V/20=30V, which may lead to insulation failure of the heaters due to overvoltage, further lead to the insulation failure of battery packs and connecting wires, and may even cause accidents such as battery pack explosion. Compared with the aforementioned, in this example, the heating loops of various battery packs are independent of each other, and the power supply voltage of the heater is only related to the voltage of the corresponding battery, and is not limited by the power supply voltage of by the high-voltage box and the number of the heaters. When the number of battery packs needs to be increased or decreased, it is only necessary to turn on or turn off the battery pack and the second switch module, which is beneficial to platformization.

In addition, the heaters in the battery packs do not need to be connected with a high-voltage wiring harness, and therefore, there is no need to provide a high-voltage interface for leading out the high-voltage wiring harness on each battery pack, but an original low-voltage interface of each battery pack is directly used for leading out a low-voltage wiring harness connected to the control end of the first switch module, and the other end of the low-voltage wiring harness is connected to the drive module through the second switch module, so that the drive module outputs a drive signal to the control end of the first switch module through the low-voltage wiring harness. There is no need to arrange a high-voltage wiring harness connection interface on the battery pack, nor to use a high-voltage wiring harness for connection. Compared with the increased cost of arranging a low-voltage relay in the battery pack and connecting the low-voltage wiring harness to form a heating loop, the former saves more costs. Therefore, the cost of the entire heating circuit can be effectively reduced.

In some examples, battery management system 2, drive module 3, and second switch module 4 are all integrated on a circuit board of the high-voltage box.

In some examples, second switch module 4 is a low-voltage relay. The heater in the example of the present application does not require high-voltage power supply by the drive module in the high-voltage box, but accepts low-voltage power supply by the battery, and therefore, the second switch module may use a low-voltage relay, which can reduce the cost of the heatable battery system to a certain extent compared with the use of a switch module such as the high-voltage relay.

An example of the present application provides a vehicle, including the above heatable battery system.

The above examples are merely used for illustrating rather than limiting the technical solutions of the present application. Although the present application has been described in detail with reference to the above various examples, those of ordinary skill in the art should understand that the technical solutions recorded in the above various examples can still be modified, or some or all of the technical features therein can be equivalently substituted. However, such modifications or substitutions do not make the essence of the corresponding technical solutions depart from the scope of the technical solutions of the various examples of the present application.

What is claimed is:

1. A heatable battery system, comprising: a battery management system, a drive module, a second switch module, and a plurality of heatable battery packs, wherein each of the plurality of heatable battery packs comprises: a battery, a first switch module, a heater, and a current sensor; wherein:
the battery, the first switch module, the heater, and the current sensor are connected in series to form a heating loop;
a first end of the first switch module is connected to the battery, a second end of the first switch module is connected to the heater, and a control end of the first switch module is connected to a first end of the second switch module;
the second switch module is a low-voltage relay, a second end of the second switch module is connected to the drive module, and the second switch module is connected to the battery management system through the drive module;
the first switch module turns on the heating loop after a drive signal output by the drive module is received;
the battery management system is respectively connected to a detection end of each of the plurality of heatable battery packs and a control end of the second switch module;
the current sensor is configured to measure a current of the heating loop; and
the battery management system is configured to:
calculate a present battery capacity of the battery based on the current measured by the current sensor; and based on the present battery capacity of the battery, turn on the second switch module to connect the drive module and the control end of the first switch module, to cause the first switch module to receive the drive signal and turn on the heating loop.

2. The heatable battery system according to claim 1, wherein each of the plurality of heatable battery packs further comprises a manual switch, and the manual switch is connected in series in the heating loop.

3. The heatable battery system according to claim 1, wherein the first switch module is a low-voltage relay.

4. The heatable battery system according to claim 1, wherein the battery, the first switch module, and the heater are connected in series through a low-voltage wiring harness to form a heating loop.

5. The heatable battery system according to claim 4, wherein the low-voltage wiring harness is integrated into a low-voltage wiring harness of each of the plurality of heatable battery packs.

6. The heatable battery system according to claim 1, wherein the battery management system, the drive module, and the second switch module are all integrated on a circuit board in the high-voltage box.

7. The heatable battery system according to claim 1, wherein the battery management system is configured to turn on the second switch module when it is determined that the heater in each of the heatable battery packs is required to heat the battery.

8. The heatable battery system according to claim 1, wherein the battery management system is further configured to turn on the second switch module in response to determining that a heater in a respective heatable battery pack of the plurality of heatable battery packs is required to heat the battery, and the current battery capacity of the battery is greater than a preset threshold.

9. The heatable battery system according to claim 1, wherein the battery management system is further configured to indirectly turn off the first switch module by turning off the second switch module in response to determining that the current on the heating loop is greater than a preset current.

10. The heatable battery system according to claim 1, wherein a power supply voltage provided by the drive module matches the number of heaters in the plurality of heatable battery packs connected in series.

11. The heatable battery system according to claim 1, wherein the respective heater in each of the plurality of heatable battery packs is lead out through a low-voltage interface of the heatable battery pack and connected to a low-voltage wiring harness of the control end of the first switch module, and the other end of the low-voltage wiring harness is connected to the drive module through the second switch module.

12. A vehicle, comprising the heatable battery system according to claim 1.

\* \* \* \* \*